United States Patent
Smith et al.

(10) Patent No.: US 6,649,740 B1
(45) Date of Patent: Nov. 18, 2003

(54) HYDRATABLE FORM OF KERATIN FOR USE AS A SOIL AMENDMENT

(75) Inventors: Robert Allen Smith, Jackson, MS (US); Scott F. Timmons, San Antonio, TX (US); Mark E. Van Dyke, Fair Oaks Ranch, TX (US); Cheryl R. Blanchard, San Antonio, TX (US); Arlene J. Siller-Jackson, Helotes, TX (US)

(73) Assignee: Keraplast Technologies, Ltd., San Antonio, TX (US)

( * ) Notice: Subject to any disclaimer, the term of this patent is extended or adjusted under 35 U.S.C. 154(b) by 0 days.

(21) Appl. No.: 09/516,755

(22) Filed: Mar. 1, 2000

(51) Int. Cl.$^7$ .......................... A61K 38/17; C07K 14/00
(52) U.S. Cl. ........................ 530/357; 530/355; 530/842; 530/418; 530/422; 530/423; 514/2; 73/73; 106/900
(58) Field of Search ................................. 530/357, 355, 530/842, 418, 422, 423; 514/12; 73/73; 106/900

(56) References Cited

U.S. PATENT DOCUMENTS

| 5,837,029 A | 11/1998 | Behel, Jr. et al. ............... 71/63 |
| 5,932,552 A | 8/1999 | Blanchard et al. ............. 514/21 |
| 6,029,395 A | 2/2000 | Morgan ........................... 47/9 |

FOREIGN PATENT DOCUMENTS

| CN | 1137029 | 12/1996 |
| CN | 1137030 | 12/1996 |
| JP | HEI 9-59080 | 3/1997 |
| JP | 2001087754 | 9/1999 |
| PL | 160363 | 3/1993 |
| RU | 378382 | 4/1973 |

OTHER PUBLICATIONS

Zhang, et al., "Study on a new type of amino–acid chelated trace fertilizer," Chemical Industry and Engineering, 13(4): 40–46 (1996).

Choi, et al., "Developing a slow–release nitrogen fertilizer from organic sources: I. using nonviable bacteria," J. Amer. Soc. Hort. Sci. 121(4):629–33, 1996.

Choi, et al., Developing a slow–release nitrogen fertilizer from organic sources; II, using poultry feathres,: J. Amer. Soc. Hort. Sci. 121(4):634–38, 1996.

Chye, "Human hair waste and its potential utilization," Journal of the Singapore National Academy of Science, (8): 76–80, 1979.

Dabek–Szreniawska, "Effect of keratin–carbamide fertilization on microorganisms in soil aggregates," Polish Journal of Soil Science, XXVI(1), 1993.

Hadas, et al., "Feather meal, a semi–slow–release nitrogen fertilizer for organic farming," Fertilizer Research 38: 165–70, 1994.

O–Neil, "Science watch; oil spills? ask a hairdresser," The New York Times, Sec. F, p. 4, Col. 6, Science Desk, Jun. 9, 1998.

Setti, et al., "Enhanced degradation of heavy oil in an aqueous system by a pseudomonas sp. in the presence of natural and synthetic sorbents," Bioresource Technology 67: 1991–99, 1999.

Sieveking, "Strange but true; barber uses his head to clean up oil spills hair," The Sunday Telegraph, 24, 1998.

Uhlenbrock, :Roots of the matter; barber swears by hair to make gardens grow, St. Louis Post–Dispatch, News, 1D, May 12, 1996.

Van Dyke, et al., U.S. application Ser. No. 09/394,782.

Wainwright, et al., "Fertilizer potential of some commercially available forms of keratin and microbial biomass," Enzyme Microb. Techol. 7: 108–110, 1985.

Williams, et al., "Low, controlled nutrient availability provided by organic waste materials for chrysanthemum," J. Amer. Soc. Hort. Sci. 117(3): 422–429, 1992.

Primary Examiner—Christopher S. F. Low
Assistant Examiner—Chih-Min Kam
(74) Attorney, Agent, or Firm—Vinson & Elkins, L.L.P.

(57) ABSTRACT

A hydratable oxidized keratin composition comprising one or more metal ion species capable of absorbing water to form a hydrogel. The keratin material is useful as a soil amendment providing organic and inorganic nutrients. The keratin material is also useful as a nutrient source in the bioremediation of toxic contaminants soils and liquids.

23 Claims, 3 Drawing Sheets

HYDRATABLE FORM OF KERATIN FOR USE AS A SOIL AMENDMENT

BACKGROUND

1. Field of the Invention

The invention relates to compositions and methods of use for soil amendments and bioremediation. More particularly, the invention relates to compositions and methods of use of hydratable keratin and keratin hydrogels as soil amendments and nutrient sources for bioremediation.

2. Description of Related Art

Keratin is a protein characterized by the prevalence of cysteine which, when crosslinked, render most keratins insoluble and environmentally robust in that they are resistant to hydrolysis and dissolution. Nitrogen release from unmodified poultry feathers has been reported as being too slow for use as a greenhouse fertilizer (Williams and Nelson, 1992). But, production of a feather meal by pressurized steam treatment, which breaks disulfide bonds, results in an increased rate of nitrogen mineralization (Hadas and Kautsky, 1994; Choi and Nelson, 1996). Feather meal also releases organic sulfur as plant available $SO_4^{2-}$ (Wainwright et al., 1985). The availability of nitrogen may also be enhanced by microbial action by composting keratin material. Fertilizers have also utilized keratin materials after complete hydrolysis to component amino acids. Chelates of such amino acids have been used as trace element fertilizers (Baolin et al., 1995). Mineral-organic fertilizers have also been prepared by mixing minerals with keratin hydrolyzates.

A possible limitation on crude keratin fertilizer preparations is that it may enrich the soil with keratolytic fungi which may be pathogenic to man and animals (Wainwright et al., 1985). Leather meal as a keratin source is also problematic because of the possibility of incorporating tanning agents such as chromium. Feather meal is malodorous, but can be made odor-free and more easily composted by autoclave treatment (Choi and Nelson, 1996).

An adequate supply of water is essential for plant survival and control of soil hydration is required for optimal plant growth. A number of soil moisture systems require a monitoring system that regulates an external water supply. Examples of such systems are disclosed in U.S. Pat. Nos. 4,796,654 and 4,182,357. These systems require a considerable amount of equipment, which will in turn require maintenance. U.S. Pat. No. 5,814,123 discloses the addition of humectants to enhance soil water retention. A humectant is a compound or material that has an avidity for water and will promote the retention of water in the soil. However, under some circumstances such a compound may compete with plants for the moisture retained in the soil. There is a continuing need for materials that can both enhance water holding capability and promote the retention of the moisture content of soil.

Bioremediation of soil utilizes microorganisms to degrade environmental contaminants such as hydrocarbons and halogenated chemicals. The rate and extent of microbial degradation is limited by the availability of nutrients in the contaminated soil. Without added nutrients, the microbial degradation of environmental contaminants can take an undesirably long time. Even with a nutrient supply, in situ bioremediation can be a prolonged process and preferred characteristics of microbial nutrient sources are that they are long acting, resistant to leaching, and biodegradable such that undesirable residues from the nutrient source are not left in the remediated soil. Groundwater is also amenable to bioremediation and permeable bio-active barriers are used to act as in situ bioremediation filters (Sutherson, 1997). Desirable characteristics for such barrier constituents are water permeability and a non-leachable nutrient source for support of a microbial population.

Physical barriers are also used in containment of environmental contaminants. Hair has been proposed as a physical adsorbent for the remediation of oil spills. Keratin preparations have also been disclosed as adsorbents for heavy metals (Japanese Patent Abstracts JP53042281, JP4281856). Natural sorbents, including keratin, have been used as physical sorbents for heavy oil in bioremediation studies (Setti et al., 1999). The use of sorbents increased the rate of n-alkane degradation, possibly due to the formation of a water/cell/oil/sorbent interphase. Natural sorbents are preferred because of their biodegradability.

SUMMARY

The present invention provides a soil amendment comprising a chemically modified oxidized keratin that upon hydration forms a hydroge. The keratin hydrogel can increase the water retention properties of soil and provide a source of organic and inorganic nutrients. The hydrogel can also support the remediation of contaminated soil and groundwater by adsorbing environmental toxins and/or providing a nutrient source for microorganisms capable of degrading the environmental toxins.

In the context of the present invention, the term "hydratable keratin" and "hydratable keratin material" is a keratin or keratin material that when hydrated forms a hydrogel.

One aspect of the present invention is a soil amendment composition comprising an oxidized keratin hydrogel. The oxidized keratin includes sulfonate groups and is associated with one or more metal ion species. "Association" and "associated" are defined in regard to the interaction between oxidized keratin and metal ion species as including both ionic bonds, that is heteropolar bonds between a negative anion and a positive cation, and chelates, wherein a metal is bonded to another molecule by a covalent bonding process or a coordination based on the donation of a free electron pair of one atom. It is believed that the predominant bonding is ionic and involves the sulfonic acid residues of the oxidized keratin. In the practice of preferred embodiments of the invention, one may select any suitable metal ion depending on the particular application, or the particular needs of the soil to be treated. For example, soils that are depleted in potassium or other plant nutrients, or that may be depleted in a cation or metal such as iron or zinc, for example, useful for microbial growth would be treated with a soil amendment that contained one or more of those metals or cations. In preferred embodiments, the one or more metal ions or cations associated with the oxidized keratin may include, but are not limited to potassium, sodium, copper, zinc, manganese, magnesium, iron, calcium and combinations of these.

The keratin source for the soil amendment composition may be any suitable source of keratin, either a soft keratin or a hard keratin, and would include keratin derived from animal or human hair, feathers, leather, skin, fur, animal hooves, animal or human nails, beaks, claws, scales, feet and horns, and is preferably a keratin that includes oxidizable amino acids such as cystines. In certain embodiments, the soil amendment may also further comprise a preservative such as an antifungal agent. Preservatives for use in the practice of the invention would include, but are not limited to tetraalkylammonium hydroxide, glutaraldehyde or formalin, and in certain preferred embodiments tetraalkylammonium hydroxide is used.

The soil amendment keratin hydrogel composition may be made by the process comprising oxidizing disulfide bonds in a keratin material with an oxidizing agent to obtain a keratin solid having sulfonic acid residues. Any suitable oxidizing agent may be used in the practice of the invention, including, but not limited to hydrogen peroxide, alkali peroxides, peracids, perborates, percarbonates, persulfates, hypochlorite or chlorine dioxide, with hydrogen peroxide or peracetic acid being the most preferred for certain embodiments. The oxidized keratin solid is separated and mixed with a water-miscible solvent containing one or more metal ion or cationic species such that the one or more metal ions or cationic species become associated with the oxidized keratin solid. The water-miscible solvent may contain up to about 20 volume percent of water. The water-miscible solvent is substantially removed and the oxidized keratin is hydrated to form a hydrogel. Any suitable water miscible solvent known in the art may be used in the practice of the invention. Exemplary solvents include lower alkyl alcohols such as methanol, ethanol, isopropanol, t-butanol or n-propanol, for example. Other solvents that may be used include, but are not limited to tetrahydrofuran, acetone, or acetonitrile, and combinations. The foregoing solvents may be used with up to 20 volume percent of water.

Another aspect of the present invention is a process for making a hydratable keratinderived soil amendment material. The keratin material may be any suitable source of keratin, either a soft keratin or a hard keratin, and would include keratin derived from animal or human hair, feathers, leather, skin, fur, animal hooves, animal or human nails, beaks, claws, scales, feet and horns, and is preferably a keratin that includes ionizable amino acids. The process comprises the steps of oxidizing a keratin material in a first solution with an oxidizing agent such that a portion of the disulfide bonds of said keratin material are oxidized to form sulfonic acid residues and forms an oxidized keratin solid fraction. The oxidizing agent may be any suitable agent, including, but not limited to hydrogen peroxide, alkali peroxides, peracids, perborates, percarbonates, and persulfates. The oxidized keratin is separated as a solid fraction from the first solution and added to a second solution comprising one or more metal ions dissolved in an neutral or slightly alkaline water-miscible solvent. The water miscible solvent may be any suitable solvent and in certain embodiments is a lower alkyl alcohol selected from the group comprising methanol, ethanol, isopropanol, t-butanol or n-propanol, and combinations of these. Other solvents that may be used include, but are not limited to tetrahydrofuran, acetone, or acetonitrile, and combinations of these. The solvents may be used with up to 20 volume percent of water. The second solution containing the oxidized keratin is maintained for a time and temperature effective to cause an association between the oxidized keratin and said one or more metal ions. It is understood, of course, that the metal ion or other cation in the second solution will associate with the oxidized keratin material, and that one controls the types and amounts of ions so associated by adjusting the concentration of such ions in the second solution. The one or more metal ion or cationic species associated with the oxidized keratin may be any suitable ions and would include potassium, sodium, copper, zinc, manganese, magnesium and calcium. The second solution is subsequently substantially removed so as to obtain a hydratable keratin material. The process may further comprise hydrating the keratin material to form a hydrogel. It is also understood that hydration of the hydrogel may include water soluble materials that are taken up in the hydrogel with the water, and that such materials, including plant or microbial nutrients, for example, would leach out of the hydrogel over time.

One aspect of the invention is compositions and methods for increasing the water retention properties of soil. One such method comprises the addition of a hydratable keratin material as described herein to soil. The keratin material may contain sulfonate groups as described above, and may be associated with one or more metal ion or cationic species.

In the practice of this method, one would normally mix the solid obtained after treatment with water-miscible organic solvent solution described above in a dried state with an appropriate amount of soil. The keratin material may also be at least partially hydrated prior to addition to the soil such that it is in a hydrogel state. The hydrogel may be added to soil in any appropriate amount. For certain embodiments, the hydrogel may contribute from 5% to about 95% of the total weight of the mixture. It is also understood that the keratin hydrogel material may serve as the total plant growth support for certain plants, particularly for use in potted plants and seedlings, or for the growth of epiphytes, for example. In certain embodiments, the keratin material may contribute from about 1% to about 25%, or from about 1% to about 10% or from about 1% to about 5% of the total weight of the hydrogel/soil mixture. The hydratable keratin material may also provide nitrogen to the soil upon microbial degradation of the keratin material.

Another aspect of the present invention is a method for providing trace metal nutrients to soil comprising addition to soil of a hydratable keratin material. The hydratable keratin material may contain sulfonate groups and be associated with a plurality of metal ions species, and may be provided to the soil in either a dried or hydrated (hydrogel) state. The plurality of metal ion species may include, but is not limited to potassium, sodium, copper, zinc, manganese, magnesium or calcium. Any metal or other ion that associates with the hydrogel material may also be added to the soil by this method. The hydratable keratin material may also provide nitrogen or other nutrients to the soil upon degradation of the keratin material.

An aspect of the present invention is also a method for supporting the bioremediation of soil comprising addition of a hydratable keratin material to soil, such that the keratin material provides a nutrient source for microorganisms capable of remediating soil contaminated with environmental toxins. The hydratable keratin materials may comprise sulfonate groups and be associated with one or more metal ion species, and may be added in a dried state, or the hydratable keratin material may be hydrated to form a hydrogel. In the practice of this embodiment, the contaminated soil may be left in place, and the keratin material added to it and mixed, or alternatively, the soil may be removed from the site of contamination and treated at a remote location. A bacterial culture capable of removing, digesting, or concentrating a toxin or contaminate may be added directly to the soil, it may pre-exist in the soil, or it may be added to the keratin material prior to application to a material in need of remediation. All such uses known to those of skill in the art would be encompassed by the spirit and scope of the appended claims.

Another aspect of the present invention is a method for the bioremediation of groundwater contaminated with environmental toxins by providing a microorganism nutrient source comprising a hydratable keratin material. The hydratable keratin material may comprise sulfonate groups and may be associated with one or more metal ion species. In the practice of the invention, contaminated water may be mixed with a dried hydratable keratin material or a hydrogel, or it may be contacted with a hydrated keratin hydrogel material as in an in-line filter, or in a vessel.

Other aspects of the invention include methods for reducing the migration of environmental toxins in soil and water by providing a barrier against movement of contaminated or contaminating materials. In the practice of the method, hydratable keratin materials that may contain sulfonate groups and be associated with one or more metal ion species, may be used as a barrier. In certain embodiments, to reduce or control migration of a soil contaminant, a ditch may be placed around a contaminated area and filled with keratin hydrogel material. This practice offers the advantage that as the keratin material may become contaminated, it can be easily removed and replaced with fresh keratin hydrogel material. In an alternative embodiment, reduction of the migration of environmental toxins in groundwater may utilize a permeable barrier which intersects the flow of a plume of toxins. The hydratable keratin material may also provide a nutrient source for microorganisms capable of remediating soil contaminated with environmental toxins.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
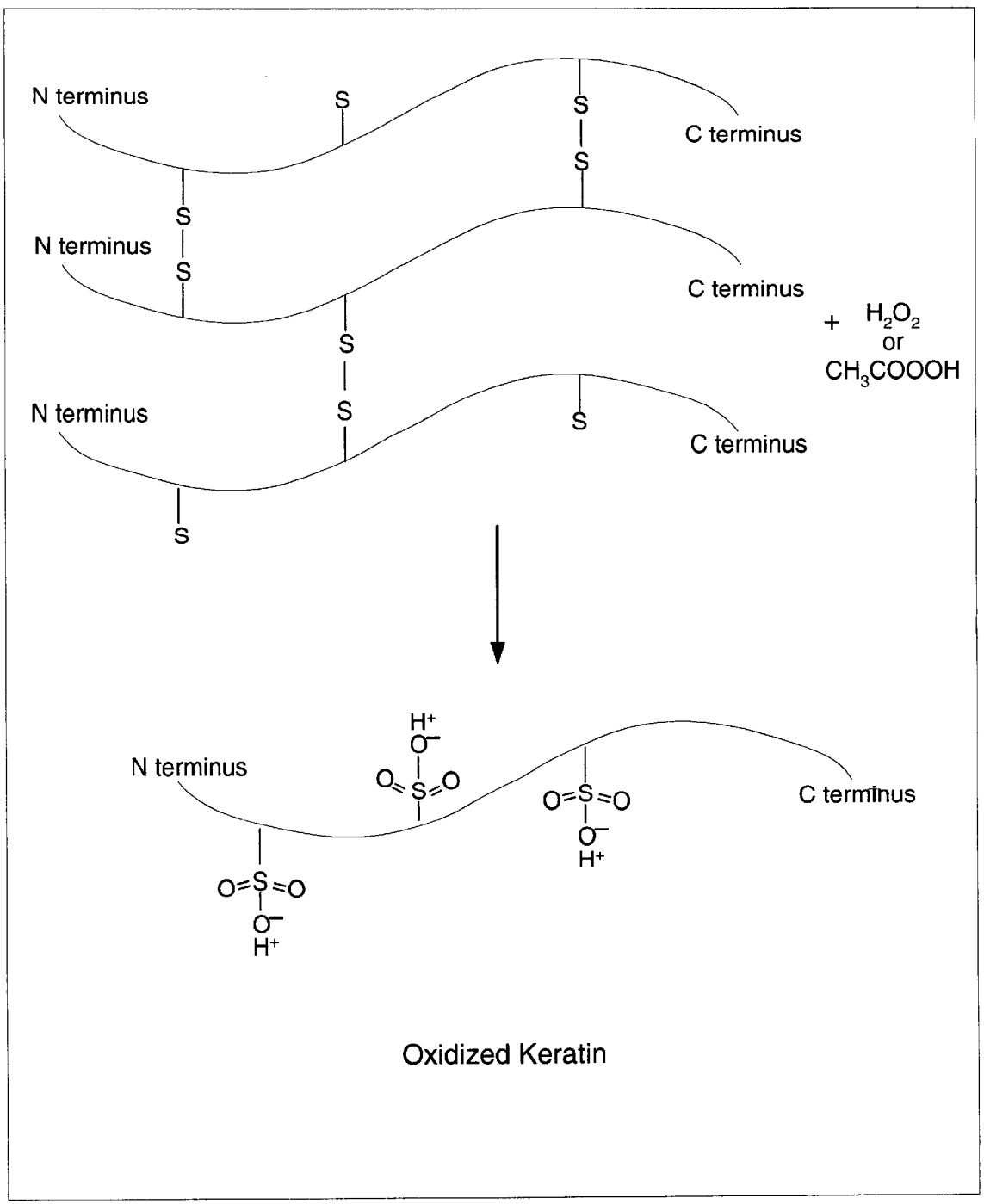
FIG. 1. Schematic of the oxidation of keratin cystine residues to sulfonic acid groups.

The copending invention disclosure U.S. application Ser. No. 09/394,782, filed Sep. 13, 1999, entitled "Water Absorbent Keratin and Gel Formed Therefrom" describes the process by which a hydratable keratin material is produced and is herein incorporated in its entirety by reference. The keratin protein of the present invention may be obtained from any natural keratin source such as animal or human hair, feathers, leather, skin, fur, animal hooves, animal or human nails, beaks, claws, scales, feet and horns, and modified in such a way as to make the keratin protein highly water absorbent. Hydratable keratin may be produced by cleaving a substantial amount, but not all, of the of disulfide cystine crosslinks. Disulfide scission may be accomplished by either oxidative (Alexander and Erland, 1950) or reducing means (Wornell, 1948). Hydrogen peroxide or other oxidative treatment of hair causes the disulfide linkages between cystine residues to convert to sulfonic acid groups as shown in FIG. 1. The subsequent treatment of the oxidized keratin with dilute alkali produces an anionic polyelectrolyte form of keratin. If the oxidation exhaustively converts the cystine amino acids into cysteic acid then the keratin is usually rendered soluble by the alkali treatment. If only a portion of the cystine amino acids are converted to cysteic acid, the alkali treatment to neutrality will produce an insoluble keratin material held together by the remaining cystine disulfide bonds. In this case, the keratin solid is converted to a material capable of absorbing a substantial amount of water producing a material best described as a hydrogel. Rather than being absorbent by capillary activity, this polyelectrolytic form of keratin has the capability to form hydrogen bonds with molecules such as water. The formation of these hydrogen bonds provides the molecular network which, when swelled with water, can form a hydrogel. The hydrogel of the present invention is formed through the reactivity of a polyelectrolytic form of keratin; however, this keratin is insoluble in water. The nature of the cationic counterion to the hydratable keratin can be tailored to suit the application. For example, exchanging the acidic protons of the sulfonic acid with potassium hydroxide alkali will produce a hydratable form of keratin that contains substantial potassium. For this form of the hydratable keratin, the NPK value would be approximately 12-0-5 which is appropriate for use as both a water retaining additive as well as a high nitrogen and potassium fertilizer. Other metal hydroxides are employed to provide trace minerals as required for vigorous plant growth. Quaternary ammonium compounds such as benzyltrimethylammonium hydroxide are employed to delay microbial degradation or act as a preservative. Incorporation of the hydrogel into soils at higher levels, greater than 5% by weight for example, produces a hydrated soil that is substantially devoid of pore volume.

Bioremediation is a treatment process that uses naturally occurring microorganisms, such as bacteria and fungi, to degrade hazardous substances into less toxic or nontoxic substances. Microorganisms must be healthy and active in order for bioremediation to take place. Thus bioremediation technologies are required to assist the growth of the population of microorganisms by creating appropriate environmental conditions and thereby support the maximal rate of contaminant detoxification. Bioremediation can utilize endogenous or exogenous microorganisms, the latter of which may be genetically designed for bioremediation. (Timmis and Pieper, 1999). The use of microbes isolated from soil in the bioioremediation nitro and halo organic compounds is described in U.S. Pat. No. 5,571,705, which is herein incorporated by reference.

Bioremediation of soil can be achieved either in situ or ex situ. During in situ soil bioremediation, nutrients may be pumped into the soil by injection wells. The introduction into the soil of microorganisms and nutrients using a push rod or cylinder connected to a delivery system is disclosed in U.S. Pat. No. 5,133,625, which is incorporated herein by reference. If aerobic conditions are required, oxygen can be provided by bioventing, i.e., blowing or sucking air through soil, or injection of hydrogen peroxide. Ex situ soil techniques can be faster and easier to control. The excavated soil can be used in techniques such as slurry phase and solid phase bioremediation. In a slurry phase bioreactor, the soil is mixed with water and nutrients are added. A method for slurry-phase bioremediation is disclosed in U.S. Pat. No. 5,232,596, which is incorporated herein by reference. Solid phase bioremediation treats soil in above ground containment areas and includes processes such as composting. Nutrients are mixed in with the soil.

Groundwater can also be bioremediated in situ and ex situ. In situ treatment can comprise placement of a porous barrier in a trench that intercepts a groundwater plume. Microorganisms growing in the barrier substrate can degrade contaminants as the groundwater passes through the barrier. The barrier may also function to adsorb contaminants. These trenches are typically used in less permeable aquifers with shallow contamination. (Sutherson, 1997). As a nutrient source is required in such a barrier, a permeable keratin hydrogel can provide a suitable substrate for the biologically reactive porous barrier wall. Bioremediation of groundwater can also be achieved by removal of groundwater by extraction wells to an above-ground treatment system where nutrients can be added. The remediated groundwater is returned via an injection well. An in-well device for the bioremediation of contaminants in groundwater is disclosed in U.S. Pat. No. 5,577,558, which is incorporated herein by reference.

In addition to groundwater, surface-water can also be bioremediated. Surface-water includes, but is not limited to, rivers, lakes and impoundments. Keratin hydrogel can be readily contacted with surface-waters in situ or ex situ. The keratin hydrogel may be enclosed in a water permeable container.

Since the keratin hydrogel is resistant to flow, it can provide a long-acting gelled substrate that can be used to slow or prevent the in situ migration of environmental toxins in soil or groundwater, while providing a nutritive substrate for naturally-occurring or introduced microorganisms capable of remediating the toxic substances. The hydrogel is also amenable for ex situ soil bioremediation, supplying both nutrients and controlling the level of hydration of extracted soil. For treatment of extracted groundwater, the waterpermeable nature of the keratin hydrogel can be exploited by using the gel as a physical support and nutrient source for bioremediating microorganisms.

Bioremediation can also be used for the treatment of industrial wastes prior to introduction into the environment. Methods for the bioremediation of liquid and slurry hazardous waste streams are disclosed in U.S. Pat. No. 5,922,204, which is incorporated herein by reference. Keratin hydrogels can be utilized in the bioremediation of waste streams, either in reaction vessels or as in-line permeable barriers.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Figure 2:
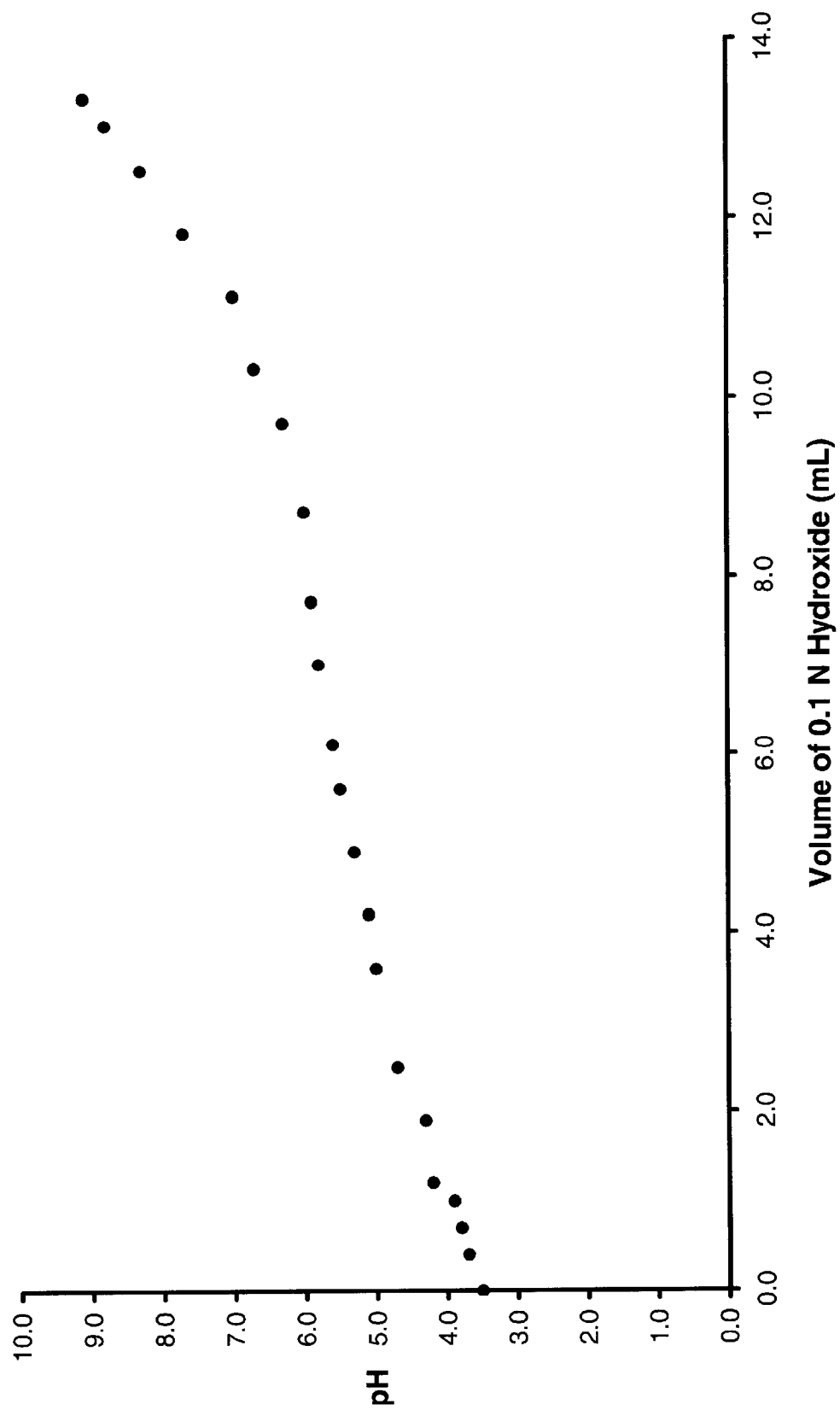
FIG. 2. Typical titration curve for a one gram sample of oxidized keratin derived from hair.
Figure 3:
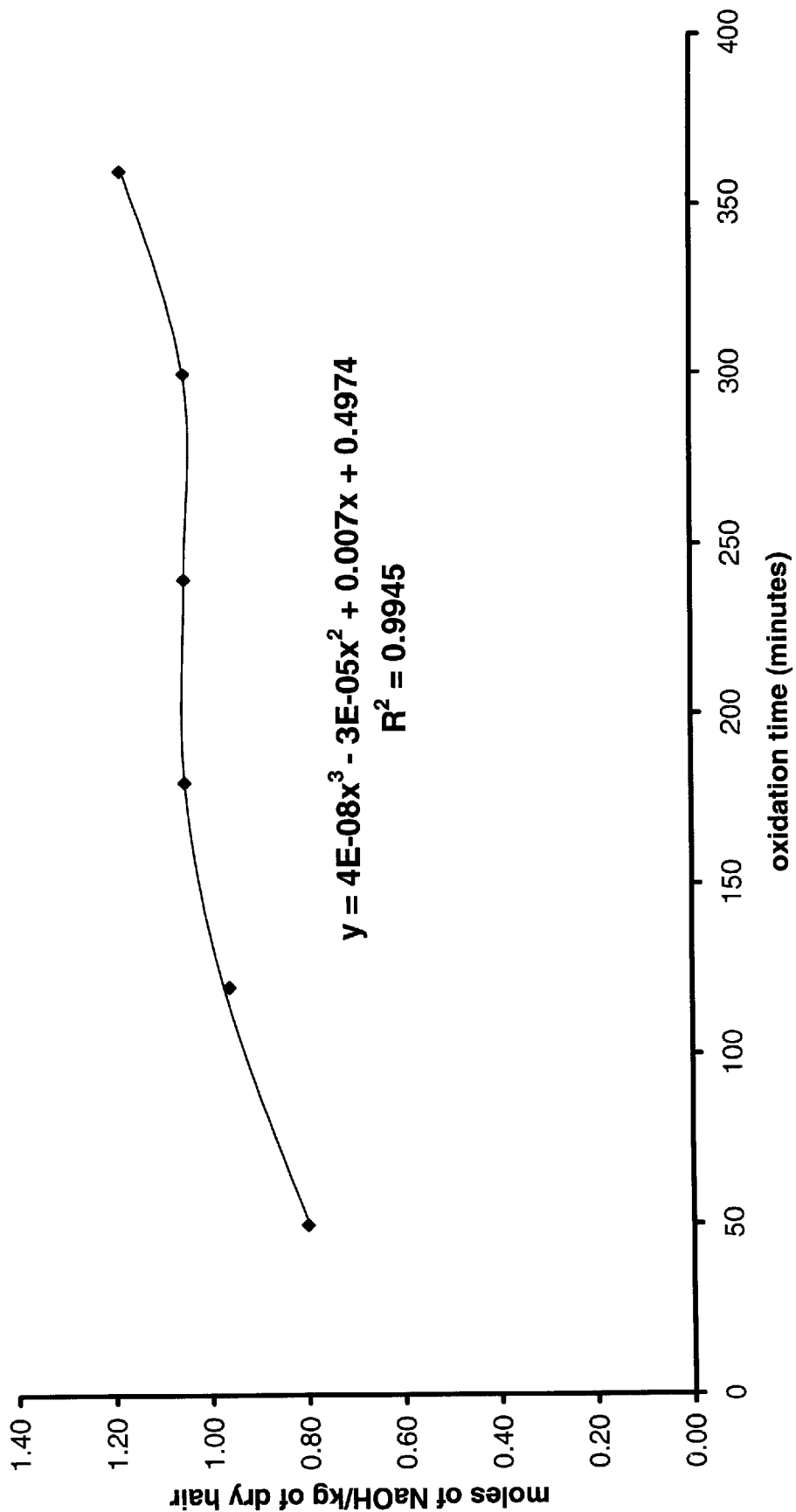
FIG. 3. Graph depicting the number of moles of sodium hydroxide required to neutralize keratin derived from hair that has been oxidized for varying times.

The hydrogel precursor is obtained by first treating human hair with a combination of an oxidizing solution, heat and/or exposure time. Said oxidizing solution is comprised of greater than 1 volume percent of oxidant such as hydrogen peroxide or peracetic acid in water. Following oxidation, the resulting solid is separated from the liquid and rinsed to remove the residual oxidant. The solid is placed into boiling alcohol such as methanol or ethanol and titrated to a pH of 7 by addition of a base such as sodium hydroxide, using a pH electrode to determine the endpoint. A typical titration curve for one gram of oxidized hair is shown in FIG. 2. The amount of base required to neutralize the hair varies dependent upon the conditions of the initial oxidation step, that is as a function of the time, temperature and concentration of oxidant used. Less vigorous oxidizing conditions will produce less disulfide scission resulting in a product that will biodegrade at a slower rate, but at the expense of the material's ability to absorb water. FIG. 3 shows the amount of base required to neutralize a gram of hair that has been oxidized for varying amounts of time. The type and amounts of the various metal hydroxides will vary with the application. For example, potassium hydroxide exchanged hair would be suitable for blooming plants, while magnesium exchanged oxidized keratin would be appropriate for growing new foliage. The types of metals exchanged can be tailored to fit a particular requirement or application.

After a period of boiling not less than 10 minutes, the neutral or slightly alkaline solution is cooled and stirred at room temperature for not less than 1 hour. The resulting solid material is removed from solution, rinsed with alcohol to remove excess base, and dried under vacuum. This process results in the formation of ionic salts which make the keratin more reactive toward water.

The dried protein is brittle and can be shredded into small fibers or ground into a powder. The modified keratin has demonstrated the capability of absorbing up to 15 to 20 times its weight of water. The water molecules penetrate the keratin fibers or powder and form ionic and hydrogen bonds to the protein molecules. The bonds provide linkages that result in the formation of a stable network. Excess water surrounds the keratin molecules and causes the material to swell into a gel.

Example 2

Release of Inorganic Nutrients

The rate of release of inorganic nutrients from the keratin soil amendments of the present invention can be readily measured. An appropriate amount of keratin hydrogel (e.g., 1–10% by weight) is added to soil. Soil samples are incubated for an appropriate time period, up to 60 to 90 days, at constant temperature (e.g., 22° C. which approximates room temperature). Control soil samples lacking the amendment are also included. Samples are contained so as to allow for gas exchange without substantial water loss. The moisture content of soil can be established by differential gravimetric analysis before and after drying or by commercially available moisture meters. A method and device for monitoring the moisture in soil is disclosed in U.S. Pat. No. 5,341,673, herein incorporated by reference.

The release of inorganic nutrients is measured at various time points. $NO_3^-$, $NH_4^+$ and $SO_4^{2-}$ can be extracted by using 10 volumes of distilled water, 1.5 M potassium chloride, or 0.1 M lithium chloride respectively (Wainwright et al., 1985). The soil extracts are shaken for 15 to 30 minutes and then filtered. Total nitrogen can be measured by the Kjedahl procedure (Eastin, 1978). $NO_3^-$ and $NH_4^+$ can be measured calorimetrically using chromotropic acid and indophenol blue methods respectively, while $SO_4^{2-}$ can be measured turbdimetrically (Hesse, 1970). The amount of inorganic nutrients can be expressed as per unit wet weight or dry weight of soil.

Example 3

Measurement of Microbial Biomass

The microbial biomass can be measured in keratin amendment treated soil or in keratin hydrogel alone. The microbial biomass may be the result of endogenous microorganisms in soil samples or the result of soil or keratin hydrogel inoculated with specific microorganisms. Soil samples or keratin hydrogel alone are kept as described in Example 2 for periods up to 60 days. At various time points the total bacterial count, proteolytic bacteria, cellulose-hydrolyzing bacteria, Azobacteria, fungi or actynomycetes counts can be determined by the methods described by Wollum (1982). Microbial biomassnitrogen can be determined by the method of Brookes et al. (1985). Measurement of other specific microorganisms or biomass parameters can be achieved by using appropriate methodologies either known or available to one of ordinary skill in the art.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. More specifically, it will be apparent that certain agents that are chemically or physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Alexander and Erland, "Structure of wool fibers", *Nature*, 166:396, 1950 Baolin et al., "Study on a new type of amino-acid chelate trace fertilizer", *Huaxe Gongye Yu Gongcheng*, 13:42, 1996.

Brookes et al., "Chloroform fumigation and release of soil nitrogen: A rapid direct extraction method to measure microbial biomass nitrogen in soil", *Soil Biol. Biochem.* 17:837, 1985. Choi and Nelson, "Developing a slow release nitrogen fertilizer from organic sources: II using poultry feathers", *J. Amer. Soc. Hort. Sci.* 121:634, 1996.

Eastin, "Total nitrogen determination for plant materials containing nitrate", *Anal. Biochem.*, 85:591, 1978.

Hadas and Kautsky, "Feather meal, a semi-slow-release nitrogen fertilizer for organic farming", *Fertilizer Res.*, 38:165, 1994.

Hesse, A Textbook of Soil Chemical Analysis, J. Murray, London, 1970. Setti et al., "Enhanced degradation of heavy oil in an aqueous system by a *Pseudomonas sp.* in the presence of natural and synthetic sorbents", *Bioresource Technology*, 67:191, 1999.

Sutherson, Remediation Engineering: Design Concepts. Lewis Publishers, 1997.

Timmis and Pieper, "Bacteria designed for bioremediation", *Trends Biotechnol.*, 17:200, 1999. Wainright et al., Fertilizer potential of some commercially available forms of keratin and microbial biomass", *Enzyme Microb. Tech.* 7:108, 1985.

Williams and Nelson, "Low, controlled nutrient availability provided by organic materials for chrysanthemum", *J. Amer. Soc. Hort. Sci.* 117:422, 1992.

Wollum, "Cultural methods for soil microorganisms", In: Methods of Soil Analysis, Agronomy 9, Part 2, (Page et al. eds, 2nd edn) pp 791–796, American Society of Agronomy, 1982. Wornell, *J. Tex. Inst.*, 39:219, 1948

What is claimed is:

1. A method for increasing the water retention properties of soil, comprising addition to soil of an insoluble hydratable keratin material at an amount from about 1% by weight to about 25% by weight effective to increase the water retention of soil.

2. The method of claim 1, wherein said hydratable keratin material comprises sulfonate groups and is associated with one or more metal ion species.

3. The method of claim 1, wherein said hydratable keratin material is hydrated to form a hydrogel.

4. The method of claim 3, wherein said hydrogel is added to soil at amount from about 1% by weight to about 5% by weight.

5. The method of claim 1, wherein said hydratable keratin material provides nitrogen to said soil.

6. A method for increasing the water retention properties of soil, comprising mixing soil with a composition comprising a hydratable keratin solid, or a keratin hydrogel, at an amount from about 1% by weight to about 25% by weight effective to increase the water retention of soil, wherein said hydratable keratin solid or keratin hydrogel includes a keratin protein associated with one or more cationic species.

7. The method of claim 6, wherein said hydratable keratin or keratin hydrogel comprises sulfonate groups.

8. The method of claim 6, wherein said keratin is obtained from a source selected from the group consisting of hair, feathers, leather, nail, skin, hooves, fur, beaks, claws and scales.

9. The method of claim 6, wherein said one or more cationic species comprise one or more metal ion species.

10. The method of claim 9, wherein said one or more metal ion species are selected from the group consisting of potassium, sodium, copper, zinc, manganese, magnesium and calcium.

11. The method of claim 6, wherein said composition further comprises a preservative.

12. The method of claim 11, wherein said preservative is a tetraalkylammonium hydroxide.

13. A method for increasing the water retention properties of soil, comprising mixing soil with a composition comprising a keratin hydrogel or a hydratable keratin solid at an amount from about 1% by weight to about 25% by weight effective to increase the water retention of soil, wherein said keratin hydrogel or hydratable keratin solid is obtained from hair, includes sulfonate groups and is associated with one or more metal ion species.

14. The method of claim 13, wherein said metal ion species are selected from the group consisting of potassium, sodium, copper, zinc, manganese, magnesium and calcium.

15. The method of claim 13, wherein the composition further comprises a preservative.

16. The method of claim 15, wherein said preservative is a tetraalkylammonium hydroxide.

17. A method for increasing the water retention properties of soil, comprising mixing soil with a composition comprising an oxidized hydratable keratin at an amount from about 1% by weight to about 25% by weight effective to increase the water retention of soil, wherein the composition is made by the process comprising:

(a) oxidizing disulfide bonds in a keratin material with an oxidizing agent to obtain an oxidized keratin solid having sulfonic acid residues;

(b) contacting said oxidized keratin solid with a neutral or slightly alkaline water-miscible solvent containing one or more metal ion species, such that said one or more metal ion species are associated with said oxidized keratin solid; and (c) removing substantially all of said water-miscible solvent to obtain an oxidized hydratable keratin.

18. The method of claim 17, further comprising hydrating said oxidized hydratable keratin to obtain an oxidized keratin hydrogel.

19. The method of claim 17, wherein said neutral or slightly alkaline water-miscible solvent comprises up to about 20 volume percent water.

20. The method of claim 17, wherein said keratin is obtained from a source selected from the group consisting of hair, feathers, leather, nail, skin, hooves, fur, beaks, claws and scales.

21. The method of claim 17, wherein said one or more metal ion species are selected from the group consisting of potassium, sodium, copper, zinc, manganese, magnesium and calcium.

22. The method of claim 17, wherein said oxidizing agent is selected from the group consisting of hydrogen peroxide, alkali peroxides, peracids, perborates, percarbonates, persulfates, hypochlorite and chlorine dioxide.

23. The method of claim 17, wherein said water-miscible solvent is a lower alkyl alcohol selected from the group consisting of methanol, ethanol, isopropanol, n-propanol; t-butanol and combinations thereof.

* * * * *